This invention relates to a screw suitable to use as a screw alone or for use in combination with a nut.

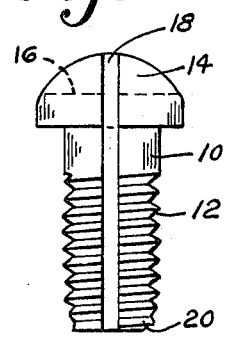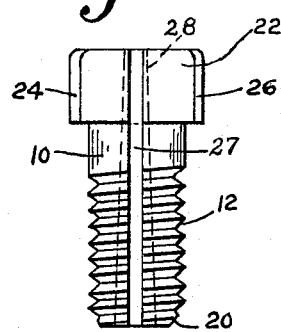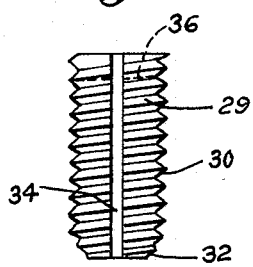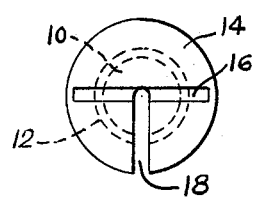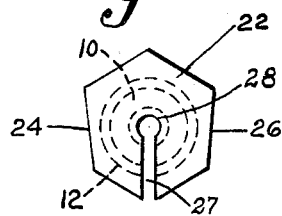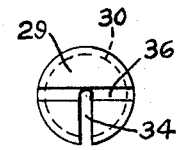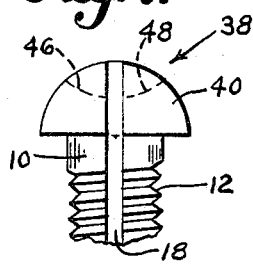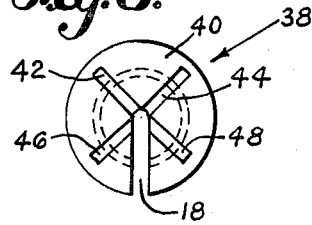
INVENTOR.
John F. Holmes
BY Harold E. Cole
Attorney 3,288,190
SELF-LOCKING SCREW WITH FRICTION
REDUCING DRIVING MEANS
John F. Holmes, 25 Strawberry Hill Road, Andover, Mass.
Filed Sept. 21, 1964, Ser. No. 397,894
2 Claims. (Cl. 151—14)

One object of my invention is to provide a screw which, upon being screwed into a hole, whether that of a nut, or to hold articles together, or to cut a thread in said articles so held, will be compressed sufficiently to be tension-locked in place, and yet can readily and evenly be unscrewed or withdrawn without damage to any member.

Another object is to provide said screw with a slot extending the overall length thereof whereby no part will have any uneven or unbalanced effect on a nut or other article that it enters.

A further object is to provide such a screw that is so simple in construction that it can readily be manufactured in large quantities at a low cost and is applicable to many different types of screws.

The foregoing and other objects which will appear as the nature of the invention is better understood, may be accomplished by a combination and arrangement such as is disclosed by the drawing. The nature of the invention is such as to render it susceptible to various changes and modifications, and, therefore, I am not to be limited to the construction disclosed by the drawing, nor to the particular arrangement described in the specification; but am entitled to all such changes therefrom as fall within the scope of my claims.

In the drawing:

FIG. 1 is a side elevational view of my screw.

FIG. 2 is a top plan view thereof.

FIG. 3 is a side elevational view of a modified form of my screw.

FIG. 4 is a top plan view of the screw shown in FIG. 3.

FIG. 5 is a side elevational view of another modified form of my screw.

FIG. 6 is a top plan view of the screw shown in FIG. 5.

FIG. 7 is a side elevational view of another modified form of my screw.

FIG. 8 is a top plan view of the screw shown in FIG. 7.

As illustrated, my screw has a main body 10 with the usual screw threads 12, and a head 14 having the usual groove 16 to receive a screw driver blade, as illustrated in said FIGS. 1 and 2. Both the body 10 and head 14 have a radial slit 18 therein that extends longitudinally and uninterruptedly from end to end. This slit 18 preferably extends radially slightly more than half-way through said body and head.

In order to be effective the entrance end of the body 10, that is shown, tapers slightly as at 20, since the diameter of the hole in a nut or other article will be slightly less than the diameter of the principal part of said body 10. Thus as the latter is screwed into said hole it is compressed slightly. This effects a tension or locking effect that will be uniform throughout the body 10 or any part of the body whose screw threads are brought into engagement with the threads of a nut or other article.

In FIGS. 3 and 4 I show a screw similar to FIG 1, but having a hexagon head 22. Two of the side surfaces 24 and 26 of the latter are eccentric or irregular so that an appropriate socket wrench will not appreciably contact the surfaces of said sides 24 and 26 and thus will have little gripping effect thereon thus causing the major portion of the gripping torque to be impressed on the faces adjacent to the slot thus tending to close the slot, making for easier removal of said screw.

This screw has a slit 27 that terminates inwardly in a bor or portion 28 that taper from one end to said head 22. This enables one to obtain differential contact pressure along the axis of the screw.

In FIGS. 5 and 6 I show a headless screw having only a body 29 that is exteriorly screw threaded as at 30 and one end is tapered as at 32. A radial slit 34, similar to slit 18 previously mentioned, extends the full length of said body 29. At one end of the latter is a groove 36 to receive a screw driver blade.

In FIGS. 7 and 8 I show a screw 38 having a Phillips-head 40 with the usual grooves therein. Two of the latter numbered 42 and 44, are regular and evenly spaced apart while the other two grooves 46 and 48, that are the nearest to said slit 18, are eccentric and space apart a distance greater than that between said grooves 42 and 44. Thus two of the blades at the end of a Phillips-head screw driver will properly fit in said grooves 42 and 44; but not into said grooves 46 and 48. The result is that in twisting the screw driver to the right, to insert the screw, the torque is applied to groves 42 and 48. The resisting torque is the friction between said threads 12 and the nut or material that has been threaded. This combination of torques will tend to close the slot 18 sufficiently to decrease the tension-locking action of this screw and make for easy insertion of the latter. The reverse action takes place upon removal of the screw. There is a torque applied to said grooves 44 and 46 and the resisting torque resulting from the friction on said threads 12 and the nut or threaded material. This combination of torques, that resist each other, will tend to close slot 18, decreasing the diameter of the threaded portion 12 thus decreasing the torque resulting from friction and making the removal of the screw easy.

What I claim is:

1. A self-locking screw formed of spring material having a threaded body and an enlarged head, said body and head having a longitudinal slit therein extending radially inwardly for the full length thereof and extending from a side surface thereof a distance more than one-half the diameter of said body and head but less than the full diameter thereof, said slit having a circular opening at its inner end of a diameter greater than the width of said slit and being co-axial with the screw, the portion of the screw at each side of the slit being resiliently deformable, whereby said body is adapted to be received in a threaded opening of less diameter than said body, said head being generally hexagon-shaped with said slit intersecting the periphery of said heat at one of the corners thereof and with the two side surfaces of the head laterally opposite said slit being eccentrically located, said two surfaces converging toward each other in the direction of the radially outer end of said slit, wherein a socket wrench gripping said head will not appreciably contact said surfaces, thus causing the major portion of the gripping torque to be applied to the surfaces adjacent the slit, thereby tending to close said slit to facilitate removal of the screw.

2. A self-locking screw formed of spring material having a threaded body and a head, said body and head having a longitudinal slit therein extending radially inwardly for the full length thereof and extending from a side surface thereof a distance equal to at least half the diameter of said body and head, the portion of the screw at each side of said slit being resiliently deformable, whereby said body is adapted to be received in a threaded opening of less diameter than said body, said head having four Phillips head grooves therein intersecting each other substantially at the axis of the screw, a first two of said grooves being equally spaced from said slit at each side thereof and being spaced apart a greater distance than are the second two grooves, the spacing between each of said first two grooves and the adjoining of the second two grooves being equal and being less than the spacing between said first two grooves, wherein the blades of a screw driver corresponding to said screw head fit said second two grooves but must be twisted to engage said first two grooves, said twisting tending to close the slit, thereby facilitating removal of the screw.

References Cited by the Examiner
UNITED STATES PATENTS

| | | | |
|---|---|---|---|
| 563,695 | 7/1896 | Toquet | 287—20 |
| 1,874,595 | 8/1932 | Olson | 151—14 |
| 2,046,025 | 6/1936 | Lee | 151—14 |
| 2,394,104 | 2/1946 | Rankin | 151—14 |
| 2,847,894 | 8/1958 | Smith et al. | 85—45 |

CARL W. TOMLIN, *Primary Examiner.*

R. S. BRITTS, *Assistant Examiner.*